(12) United States Patent
Dembesky et al.

(10) Patent No.: US 12,505,914 B2
(45) Date of Patent: Dec. 23, 2025

(54) IMAGE RECOGNITION METHOD AND PROGRAM FOR MEDICAL INSTRUMENT INVENTORY MANAGEMENT

(71) Applicant: SteriSmart LLC, Forney, TX (US)

(72) Inventors: Joseph Dembesky, Forney, TX (US); Patrick DeWitt, Ben Lomond, CA (US); Khizar Hussain, Islamabad (PK)

(73) Assignee: STERISMART LLC, Forney, TX (US)

( * ) Notice: Subject to any disclaimer, the term of this patent is extended or adjusted under 35 U.S.C. 154(b) by 0 days.

(21) Appl. No.: 18/965,134

(22) Filed: Dec. 2, 2024

(65) Prior Publication Data

US 2025/0182880 A1    Jun. 5, 2025

Related U.S. Application Data (60) Provisional application No. 63/605,150, filed on Dec. 1, 2023.

(51) Int. Cl.
| | | |
|---|---|---|
| *G06K 9/34* | (2006.01) | |
| *G06T 17/00* | (2006.01) | |
| *G16H 30/20* | (2018.01) | |

(52) U.S. Cl.
CPC ............. *G16H 30/20* (2018.01); *G06T 17/00* (2013.01)

(58) Field of Classification Search
CPC ................................. G16H 30/20; G06T 17/00
See application file for complete search history.

(56) References Cited

U.S. PATENT DOCUMENTS

| | | |
|---|---|---|
| 2020/0335208 A1 | 10/2020 | Talmor et al. |
| 2020/0364660 A1 | 11/2020 | Hines et al. |
| 2020/0381107 A1 | 12/2020 | Lowry et al. |
| 2021/0321872 A1* | 10/2021 | Saphier ................ A61B 5/7475 |
| 2022/0083782 A1* | 3/2022 | Qian ........................ G06F 18/22 |
| 2022/0292815 A1 | 9/2022 | Donnelly et al. |
| 2023/0136558 A1 | 5/2023 | Hawkins et al. |
| 2023/0386074 A1 | 11/2023 | Canton et al. |

FOREIGN PATENT DOCUMENTS

WO    WO-2023086592 A2 *    5/2023    ............. A61B 34/10

OTHER PUBLICATIONS

International Search Report and Written Opinion, issued Jan. 27, 2025, in corresponding PCT Application No. PCT/US2024/057961.

* cited by examiner

*Primary Examiner* — Xin Jia
(74) *Attorney, Agent, or Firm* — Venable LLP; Ryan T. Ward (57) ABSTRACT

Systems, methods, and computer-readable storage media for scanning medical instrument trays to determine which items are present and which are missing. This is accomplished by receiving, prior to an event, pre-event media content capturing a medical tray, then executing a model trained to recognize instruments on the medical tray, resulting in a list of pre-event found medical instruments. After the event, post-event media content capturing the medical tray is received, and the model executed again, resulting in a list of post-event found medical instruments. The list of pre-event found medical instruments is compared against the list of post-event found medical instruments, resulting in a comparison, and the results displayed.

12 Claims, 7 Drawing Sheets

IMAGE RECOGNITION METHOD AND PROGRAM FOR MEDICAL INSTRUMENT INVENTORY MANAGEMENT

CROSS-REFERENCE

This application claims priority to U.S. provisional patent application No. 63/605,150, filed Dec. 1, 2023, the contents of which are incorporated herein in their entirety.

TECHNICAL FIELD

This disclosure is generally related to image processing and machine learning to scan items, and more particularly to image processing and machine learning to scan medical instrument trays to determine which items are present and which are missing.

BACKGROUND

Medical procedures often require specific instrumentation that is cleaned and sterilized before use. Before the instrumentation undergoes sterilization, it is often either enclosed in special wrapping material or encased in a container to ensure sterility is maintained as the instrumentation is transferred from the processing area to the procedure room. Encasing the instruments can introduce complexities, in that the individuals utilizing the instrumentation do not know if all the required items are present in the tray until it is opened in the procedure room. This potential inability to verify the completeness of instrumentation trays until they are unwrapped may result in instances of missing items, which in turn leads to surgical delays, compromised patient care and increased costs for healthcare facilities.

Instrument tray verification is also a concern for medical device companies and their distributors. These entities are responsible for the logistical burden of assembling the instrument trays and then delivering them to healthcare facilities. These inventory movements are made by both employees of the medical device companies and third-party contractors. For direct employees of the medical device companies, the companies' cost and time associated with training their employees on how to properly assemble a tray and verify its completeness is immense. Even with this significant investment, the best trained logistics employees still introduce human error into the inventory management process. For deliveries that need to be made by third party contractors, there are limited options to verify that the instrumentation sets being delivered are complete.

Additionally, there can be an element of liability for hospitals in being able to determine if instruments have gone missing during a procedure. Thousands of times every year, patients leave the operating room with foreign items present in their bodies. While there have been technologies deployed to help count common items like sponges, needles, and sutures to ensure nothing is left inside the patient, there is no such technology in use for surgical instrumentation. The detection of retained items lies solely on the attentiveness of those healthcare providers in the procedure room.

Currently, the process for verifying that surgical instrument trays are complete (both at the initiation of surgery and completion of that surgery) is entirely manual and relies on the knowledge, training, and attention of those performing the task. Adding to the complexity of this task is the vast number of differentiated trays that vary by manufacturer, surgeon preference, and healthcare facility. This makes the execution of consistently verifying the completeness of surgical trays almost impossible.

There have been efforts to mitigate these risks, both technologically and mechanically. One such example is employing inventory sheets and pictures of the various instrument trays. While this process has been adopted by many healthcare facilities, it does very little to mitigate human error. The individual checking the trays against a picture or inventory sheet must show great attention to detail to ensure no item is overlooked.

Another technological solution that has been introduced is placing radio-frequency identification (RFID) tags on each instrument to determine which items are in a tray. This unfortunately has run into several roadblocks, specifically: a significant increase in cost, an inability of the RFID tags to endure the high sterilization temperatures, and the need for additional hardware (e.g., RFID reader, computer, etc.).

Techniques to mitigate intrinsic human error associated with use of devices, such as surgical instrumentation would be beneficial. Techniques of reducing human error in use of surgical instrumentation without introducing increased financial burden on healthcare facilities, the medical device industry, and other stakeholders involved in the management of surgical instrumentation would be useful.

SUMMARY

Disclosed are systems, methods, and non-transitory computer-readable storage media which provide a technical solution to the technical problem described. A method for performing the concepts disclosed herein can include: receiving, at a computer system prior to an event, pre-event media content capturing a medical tray; executing, via at least one processor of the computer system prior to the event, a model trained to recognize instruments on the medical tray, wherein: inputs to the model comprise the pre-event media content; and output of the model comprises a list of pre-event found medical instruments; receiving, at the computer system after the event, post-event media content capturing the medical tray; executing, via the at least one processor after the event, the model, wherein: inputs to the model comprise the post-event media content; and output of the model comprises a list of post-event found medical instruments; comparing, via the at least one processor, the list of pre-event found medical instruments to the list of post-event found medical instruments, resulting in a comparison; and displaying, via a display of the computer system, a notification based on the comparison.

A system configured to perform the concepts disclosed herein can include: a display; at least one processor; a non-transitory computer-readable storage medium having instructions stored which, when executed by the at least one processor, cause the at least one processor to perform operations comprising: receiving, prior to an event, pre-event media content capturing a medical tray; executing, prior to the event, a model trained to recognize medical instruments in the medical tray, wherein: inputs to the model comprise the pre-event media content; and output of the model comprises a list of pre-event found medical instruments; receiving, after the event, post-event media content capturing the medical tray; executing, after the event, the model, wherein: inputs to the model comprise the post-event media content; and output of the model comprises a list of post-event found medical instruments; comparing the list of pre-event found medical instruments to the list of post-event found medical instruments, resulting in a comparison; and causing the display to display a notification based on the comparison.

A non-transitory computer-readable storage medium configured as disclosed herein can have instructions stored which, when executed by at least one processor, cause the at least one processor to perform operations which include: receiving, prior to an event, pre-event media content capturing a medical tray; executing, prior to the event, a model trained to recognize medical instruments on the medical tray, wherein: inputs to the model comprise the pre-event media content; and output of the model comprises a list of pre-event found medical instruments; receiving, after the event, post-event media content capturing the medical tray; executing, after the event, the model, wherein: inputs to the model comprise the post-event media content; and output of the model comprises a list of post-event found medical instruments; comparing the list of pre-event found medical instruments to the list of post-event found medical instruments, resulting in a comparison; and causing a display to display a notification based on the comparison.

BRIEF DESCRIPTION OF THE DRAWINGS

Various aspects of the present disclosure are illustrated as an example and are not limited by the figures of the accompanying drawings, in which references may indicate similar elements.

DETAILED DESCRIPTION

Some embodiments of the disclosure are discussed in detail below. In describing embodiments, specific terminology is employed for the sake of clarity. However, the disclosure is not intended to be limited to the specific terminology so selected. A person skilled in the relevant art will recognize that other equivalent components can be employed, and other methods developed, without departing from the broad concepts of the disclosure. All references cited anywhere in this specification, including the Background and Detailed Description sections, are incorporated by reference as if each had been individually incorporated.

Disclosed herein are systems, methods, and computer-readable instructions which utilize computer vision models (e.g., Artificial Intelligence (AI) models) to determine the completeness of surgical instrument trays and/or perform similar tasks. Such models can, for example, use image processing, recognition, and machine learning to identify the surgical trays from among known configurations of trays, the instruments in the tray, and (when appropriate) which instruments are missing from the tray. The models may include mathematical and computational structures used to make predictions or decisions without being explicitly programmed to perform a task. The computer vision models may be trained by image segmentation to detect which instrument tray (from among a set of known instrument tray configurations) the system is viewing, and which items should be present in the tray. Image segmentation can include partitioning a digital image into discrete groups of pixels-image segments-to inform object detection and related tasks. By parsing an image's complex visual data into specifically shaped segments, image segmentation enables faster, more advanced image processing. Based on such processing, the system may then confirm which instruments are present or absent in the tray and give the user the ability to see additional information about the missing items.

While object recognition itself has been around for years, the uniqueness of systems configured as disclosed herein lies in its specific domain-medical instrument trays, where precision is critical. Medical instrument trays often contain a wide variety of small, similarly shaped instruments, which require fine-grained segmentation to differentiate between them. For example, the system must be able to detect items that differ by a millimeter or two and be capable of reading small text on the instruments to help differentiate them. Unlike facial recognition or generic object detection, this application demands the system correctly identify similar-looking instruments in variable arrangements, while taking into account overlapping, occlusion, misplacements, and/or foreign objects.

Additionally, the real-time aspect of the system not only identifies missing instruments in real-time, but also cross-references against predefined objects and tray configurations. The challenge of ensuring every instrument is accounted for with a minimal margin of error in a fast-paced environment like an operating room adds additional complexity.

As described herein, trays with instruments can include medical trays, surgical trays, or other specialty trays associated with a medical procedure. Unless otherwise specified, any example or description associated with one type of tray equally applies to another (e.g., examples given regarding a surgical tray apply to medical trays and vice versa), with a medical tray including surgical trays. Likewise, references to surgery may be exchanged for any appropriate medical procedure.

The models generated as disclosed herein can, for example, be used to identify objects in both a two-dimensional (2D) format (e.g., comparing objects captured within a 2D image of a tray against previously captured/known 2D images of objects) or a three-dimensional (3D) format (e.g., taking multiple images of a tray from different angles, generating 3D models of the captured objects based on the multiple images, and comparing the generated 3D models against models of known objects). In identifying objects using 2D recognition or 3D recognition, the system can perform image segmentation, breaking an image into distinct groups of pixels (image segments) to inform object detection. Object recognition can, in some configurations, further rely on text written upon the objects, coloring of the objects, orientation of the objects, distance from the camera, etc. The object recognition system can be trained to recognize occluded objects, or otherwise identify objects based on only a partial view from the captured images.

In some configurations, the model generated by the system can be trained on random objects, such that the model can identify unexpected objects when detected. In other configurations, the model can be trained to recognize only specific objects (e.g., those objects that would be used in surgery or other medical procedures). Likewise, in some configurations the system may deploy more than one model (e.g., one trained on random objects, one trained on specific objects). In such configurations, the system may execute a first model (e.g., the model trained on specific objects) and, if an extra, unknown object is found, then execute a second model (e.g., the model trained on random objects). In yet other configurations, both models may be executed in parallel, with the results of each model compared to one another to determine if the system detects a conflict between the results of each model.

In some configurations, the system performs inventory checks on surgical trays before and after surgery (or inventory checks on medical trays before and after a different medical procedure). For example, upon receiving a tray (prior to a surgery/medical procedure) the system may be configured to read a Quick Response (QR) code, then using the QR code to identify what the tray configuration is (i.e., what instruments should be found on the tray, and where on the tray those instruments should be located). Other identifying codes are likewise possible, such as (but not limited to) barcodes, Augmented Reality Uco Codes (ArUco), or any other identifying marker. The system can then use one or more cameras to capture images (or video) of the tray, and image processing as disclosed herein to identify which instruments are found in the tray. If any instruments are missing, the system can flag that for a surgeon, doctor, nurse, or other technician prior to beginning the surgery/medical procedure. After the surgery/medical procedure, the system can again capture images (or video) of the tray, compare the detected instruments against the list of instruments which should be there (and which were present at the beginning of the surgery/medical procedure), and inform someone if an instrument is missing. In other configurations, rather than performing such check before/after surgery/medical procedure, the system may be configured to verify tray contents before/after transporting the tray (e.g., before transporting a tray from one building to another, or before/after transporting the tray to the surgical/medical procedure site).

In still other configurations, rather than rely on a QR code or other identification, the system can receive a tray, capture one or more pictures of the instruments contained therein, and generate a list (which may or may not be reviewed by the surgeon, doctor, or other official). Then, at a later time the system can capture one or more additional pictures of the tray and compare the tray's contents against the original list, identifying any discrepancies. Likewise, if objects are later detected in the tray which were not present in the initial scan, the system may request for confirmation from a surgeon, doctor, or other official regarding the origination of that newly-detected object. In cases where the system is told that the object was present (just not detected) in the initial scan, the system can use the initial scan as part of a retraining process (i.e., retraining the neural network/object recognition model based on the original image(s) of the surgical tray and the knowledge of the full object list). In this manner, the system can improve its object-recognition capability over time.

Figure 1:
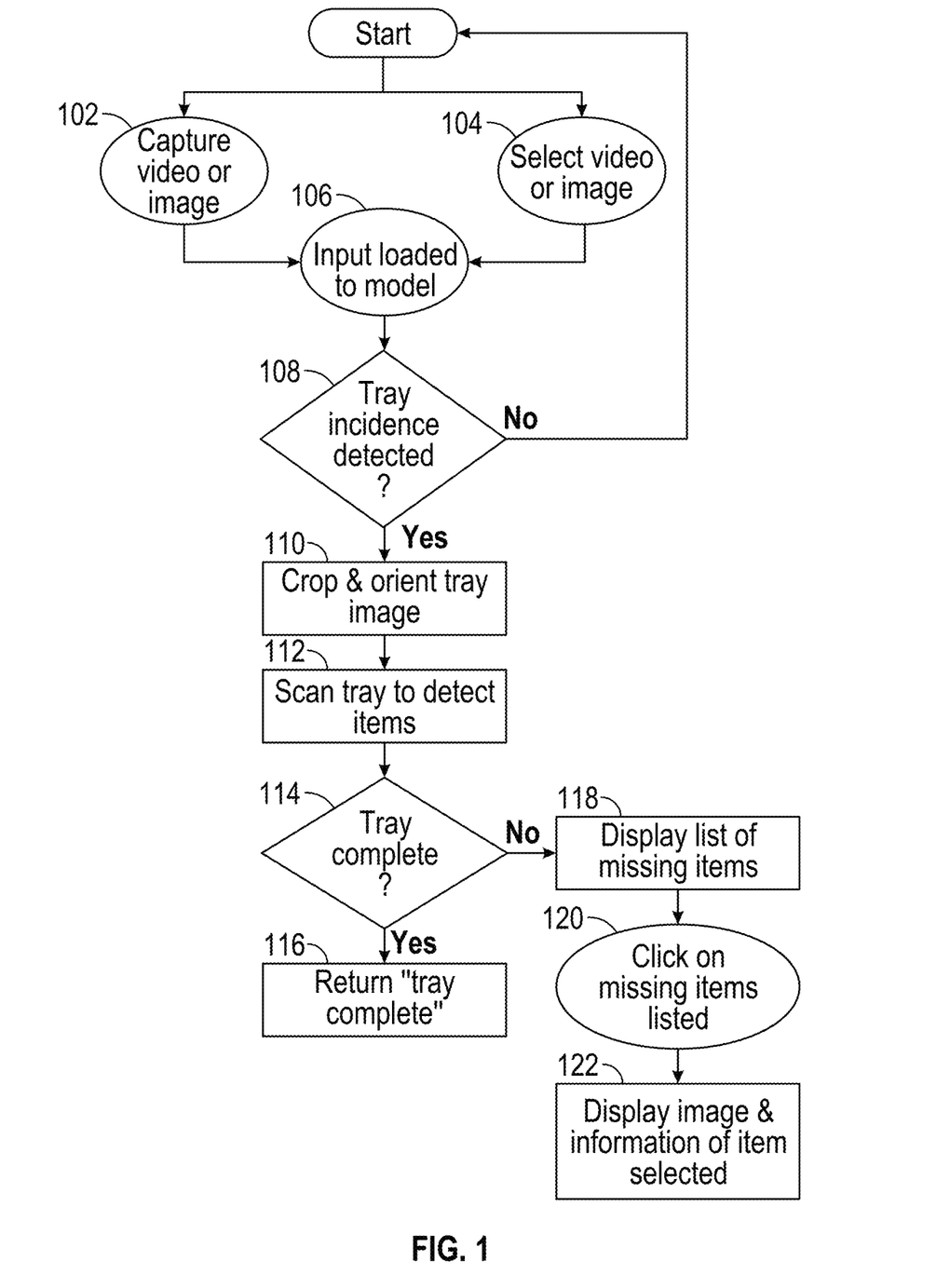
FIG. 1 includes a flowchart of an image recognition application according to various aspects of the disclosure.

FIG. 1 includes a flowchart of image recognition being conducted according to various aspects of the disclosure. In this example, a computer system is being used to detect items that may be missing from a surgical instrument tray. In some configurations the system can operate in real-time, making determinations based on video or images captured 102 as the video/images are captured. In other configurations, the user of the system can choose to capture an image or video 102 in real-time or to select an image or video 104 from a preexisting library of previously captured images/videos. In both cases, the image or video is then loaded into the model 106 to begin the detection process. The system, as part of the model execution, can detect a predefined marker (e.g., quick response (QR) code, Augmented Reality University of Cordoba (ArUco) marker, etc.) within the video or image, the predefined marker identifying the particular tray being viewed 108.

For example, the system may detect a QR code indicating that the tray configuration is number 503A1 (or any other identification format), and the system may look up which surgical instruments should correspond to that tray configuration. In other configurations, the system may, via execution of the model, determine which tray configuration is being used based on pattern recognition. For example, the system may capture an image or video of the tray arriving, then compare the image or video to a library of images or videos of trays. When the comparison indicates a match (e.g., a level of similarity above a predefined threshold, such as 95% similarity), the system can determine that the tray arriving has the same configuration as that tray whose image/video is stored in the library. Such similarity can, for example, be determined based on the number of surgical instruments matching between a known tray and the arriving tray (e.g., 29 of the 30 instruments captured in the image of the arriving tray match those of the image of a known/previously recorded tray, resulting in a 96% similarity). Instead of relying solely on object counting or direct image-to-image comparison, other techniques deployable by the system can include: Feature-based similarity matching, where key features (like shape, size, texture) of instruments are compared across trays, even if their position within a tray differs; Graph-based matching, where the spatial relationship and positioning of instruments on a tray form a graph. In such configurations, matching can be determined by comparing the structures of the graphs, rather than simple counting; and Statistical methods like Cosine similarity, Euclidean distance, or Jaccard index could measure how closely one tray's configuration matches another, beyond the pure number of items present. For example, the system may use machine learning classifiers (Support Vector Machines (SVMs), random forests) trained on tray configurations to predict if two trays match based on an array of features, including position, orientation, and occlusions.

Once the system knows the configuration of the arriving tray, the system can crop the image or video so that only those items in the arriving tray are available for further analysis. The system can also orient the now cropped image/video of the tray in the direction on which the model was trained 110. At this time, the system can scan the image/video to detect items present in the arriving tray 112 and compare the instruments in the arriving tray to instruments in the reference images/videos on which the model was trained, thereby determining if the tray is complete 114. For example, the system can scan an image of an arriving tray, thereby detecting (1) a QR code identifying the configuration of a tray (i.e., what instruments should be located on the tray) and (2) the instruments on the tray.

If the tray is complete (i.e., the arriving tray has all of the instruments which should be present), the system can return a "tray complete" 116 message to a user. However, if the system determines that items are missing from the arriving tray, the system can display those items not detected in the tray 118. Such display of the missing items can, for example, occur via a display which is part of the system. The system may also determine that items are not located in a correct position indicating, for example, prior use or tampering with the tray. At this point, the user can select one or more of the missing items 120 being displayed. Once the user selects a specific missing item from the list, an image of the item can be displayed with the item's associated part number and any other pertinent information 122 (where the predetermined information has been selected by the user). Preferably, the pertinent information to be displayed in association with a missing item has been selected by the user prior to the displaying of the selected item. However, in certain configurations the pertinent information may be selectable by the user after the missing item has been displayed. For example, the system may display a missing instrument and the user may have additional questions about the missing instrument, at which point the user selects the additional detail(s) to be displayed.

Figure 2:
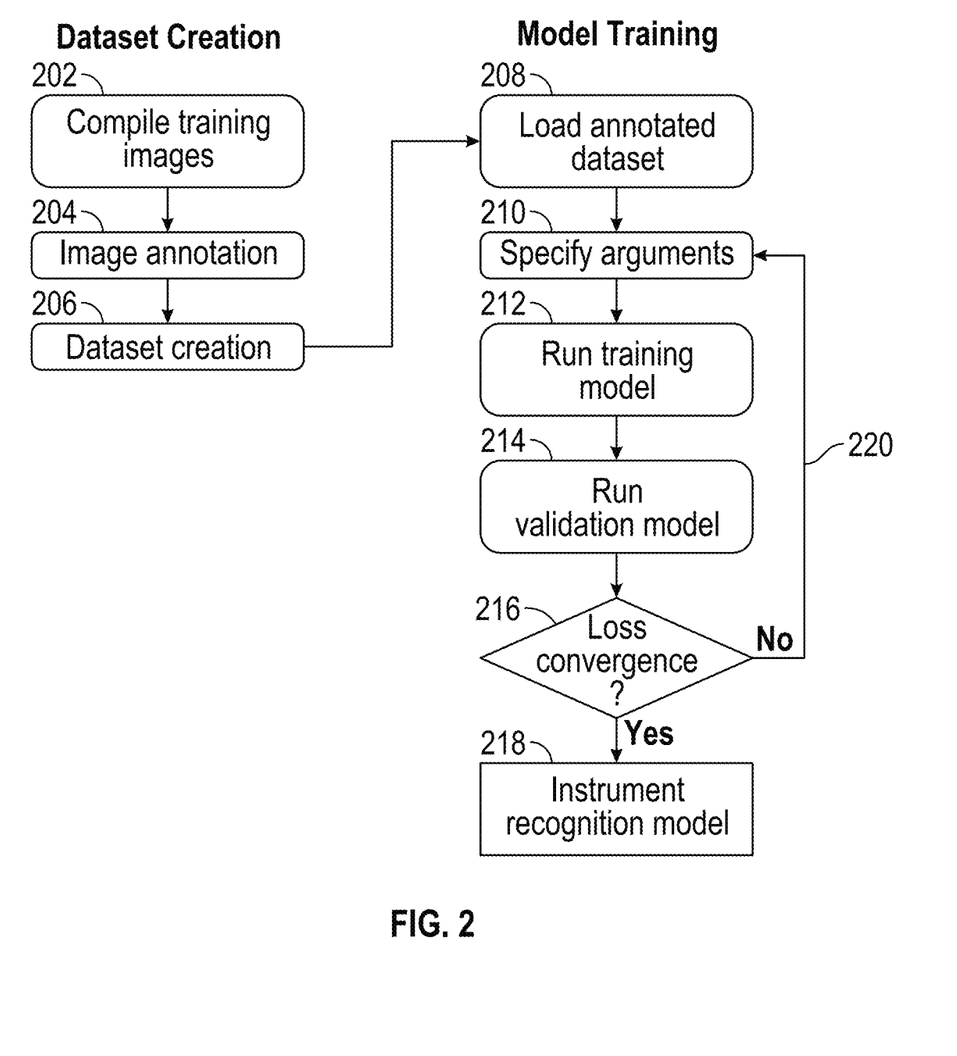
FIG. 2 depicts a flowchart of a machine learning process used to train the image recognition model according to various aspects of the disclosure.

FIG. 2 depicts a flowchart of a machine learning process used to train the image recognition model according to various aspects of the disclosure. According to various aspects, in order to train the model, an appropriately large number of reference images is first compiled 202 to create a dataset. These reference images can be images of a surgical/medical tray containing multiple instruments, or the reference images can be images of individual instruments. Each reference image is then annotated to denote every instrument contained in the reference image 204. Once all images have been properly annotated, the dataset is complete 206 and may be loaded 208 into the model training software to train the image recognition model specifically configured to recognize surgical/medical instruments.

Once the dataset has been loaded into the model training software, certain parameters can be specified 210, such as batch size, learning rate, momentum, weight decay, and the like. The image recognition model training software can then be run 212 with the given parameters. The image recognition model training software generates an image recognition model, preferably a neural network, with multiple layers of connections made based on correlations between the training data. Non-limiting examples of neural networks which can be generated can include a You Only Look Once (YOLO) model which uses an end-to-end neural network to make predictions of bounding boxes and class probabilities in a single action; a Convolutional Neural Network (CNN), which can be particularly helpful for finding patterns in images to recognize objects, classes, and categories. Other, non-limiting examples of neural networks/models which can be used by the system can include:

Transformer models, particularly Vision Transformers (ViTs), which have gained popularity for their ability to capture relationships between objects in an image.

Mask Region-based CNN (R-CNN), which can provide a more detailed object instance segmentation by applying segmentation at a pixel level rather than just bounding boxes.

ResNet-based CNNs, which focus on deeper networks with skip connections, improving model depth without performance degradation.

EfficientNet, a family of models designed to optimize performance across different scales (computational efficiency and accuracy).

Attention-based mechanisms that focus on crucial regions within an image, which could enhance the detection of small instruments.

Once training is complete and the model is generated, the resulting model undergoes validation testing 214 using a separate dataset of images/videos to determine the accuracy of the model. Preferably, the validation testing 214 uses images/videos which are distinct from the training images, but which capture the same instruments, trays, or other content captured in the training images. The model is then evaluated to determine if it is within an acceptable range of error 216. If the model does not fall within this error 216 threshold, the parameters can be readjusted 220, and the training and validation stages repeated. If the model falls within the acceptable range of error 216, the process is complete and the instrument recognition model 218 is ready for use.

Once the instrument recognition model 218 is generated, it can be used in a variety of ways. In some cases, a surgical/medical tray can consist of known instruments. For example, the tray for a given procedure may always have instruments A, B, and C on it, with A, B, and C in predefined, known locations. In such instances, the instrument recognition model 218 can be used to confirm if instruments A, B, and C are present and in their designated locations before and after the procedure.

Figure 3:
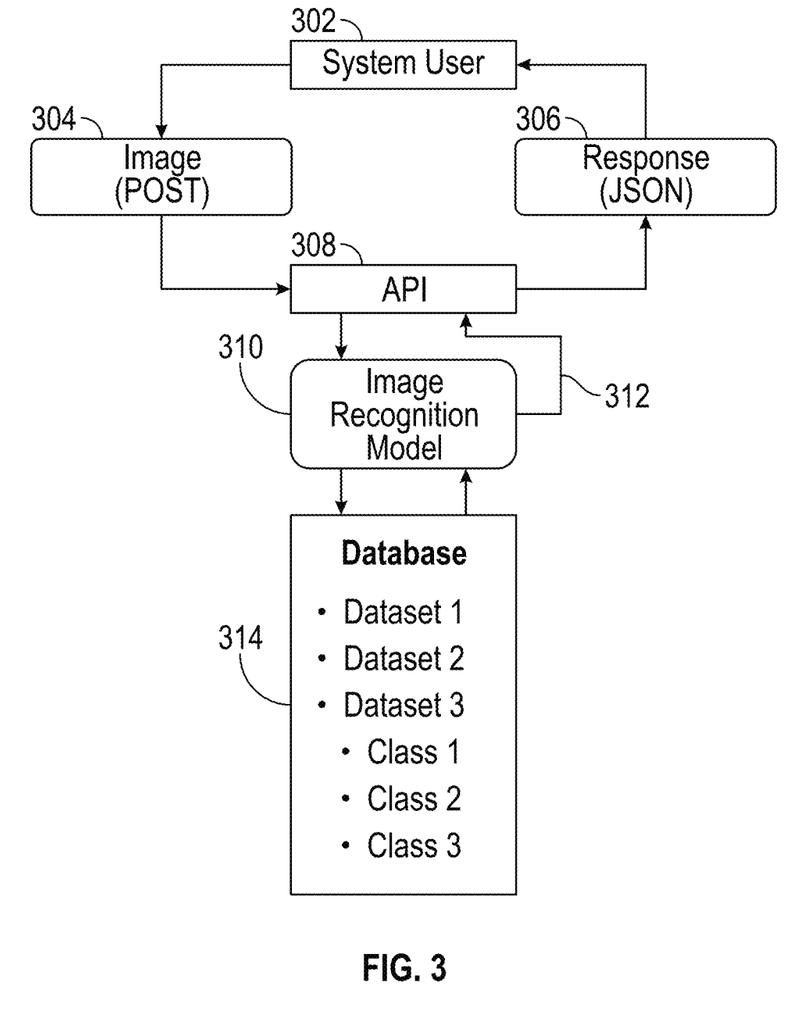
FIG. 3 depicts a flowchart of how the software and model may function according to various aspects of the disclosure.

In another example, a surgical/medical tray may have varied instruments. For example, the tray for a given procedure may have, in a first instance, instruments A, B, and D, then in a subsequent instance have instruments B, D, and Z. Such variation could, for instance, be at the discretion of the surgeon/doctor/medical professional, or could be based on the instruments available. Moreover, the instruments may or may not be in the same locations from instance to instance. Regardless of why the tray may have distinct instruments on a given day, or if the locations of the instruments remain identical from instance to instance, the system can utilize the image recognition model to detect the presence (or lack thereof) of the instruments. For example, when the tray is a custom tray, with instruments and/or locations designated by the surgeon/doctor/medical professional, the system can (1) receive a list of instruments and/or locations of those instruments when the tray is being prepared; (2) upon receiving the tray, and before beginning the procedure, capture an image/video of the tray; (3) identify the instruments present within the image/video and their locations; (4) compare the identified instruments/locations against those within the initial list, and notify FIG. 3 depicts a flowchart of how the system, executing the model, may function according to various aspects of the disclosure. A user 302 of the system initializes the system by submitting a POST request (Image) 304 to the Application Programming Interface (API) 308 endpoint for processing. The API 308 then takes the image and runs it through a pretrained and weighted image recognition model 310 (e.g., the model that whose training was described in FIG. 2) that has been trained on a database of datasets (e.g., a library of images, such as images of surgical/medical trays) and their classes (e.g., objects within the images, such as surgical/medical instruments on the trays) 314. The image recognition model 310 then conveys 312 its findings to the API 308, which in turn issues a JavaScript Object Notation (JSON) response 306 to the user 302. JSON is commonly used in web APIs because it is lightweight, human-readable, and easily parsed by any client (e.g., web, mobile, desktop). Its flexibility in representing complex data structures (like a list of missing instruments or tray configurations) makes it a good fit for communicating results quickly and effectively.

Other non-limiting examples of possible formats in which the response can be provided to the user can include: XML: More verbose, but provides a structured and standardized approach similar to JSON.

Protocol Buffers (Protobuf): A binary format that is more efficient than JSON in terms of both space and speed, but less human-readable. It can be used for environments where performance is key; and Plain Text/CSV: For simpler applications, but lacks the structural flexibility needed for complex data. The response may notify the user of the completeness of the tray, as well as other information regarding any items that might be missing.

Figure 4:
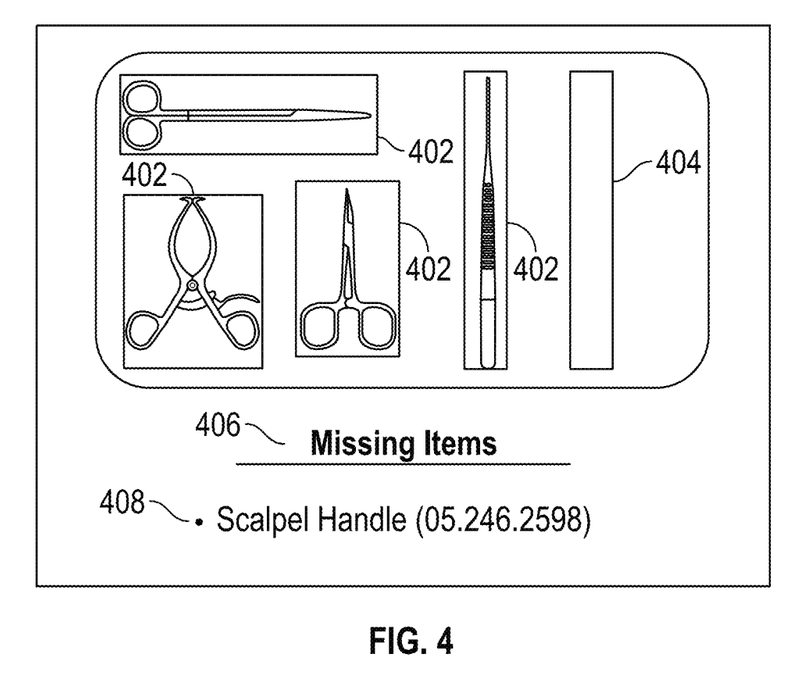
FIG. 4 illustrates an example of a user interface according to various aspects of the disclosure.

FIG. 4 illustrates an example of a user interface according to various aspects of the disclosure. As illustrated, the system can display a picture of surgical tray 401 containing multiple surgical instruments. This picture can be the cropped image used by the system for analysis, or can be the original image captured by the system. The system scans the image for surgical instruments and identifies those instruments known to be in the correct location 402. The system may identify both if the surgical instrument is found within the image and if the surgical instrument is correctly stored. In this case, the system has detected at least one missing instrument 404. Beneath the cropped image is a list of missing items 406. Preferably, the system provides a user interface which allows each element listed under "missing items" 406 to be selected by the user, where such selection causes the system to display additional information pertaining to the selected item. In this example, a scalpel handle 408 is listed, along with the part number for the scalpel handle 408.

Figure 5:
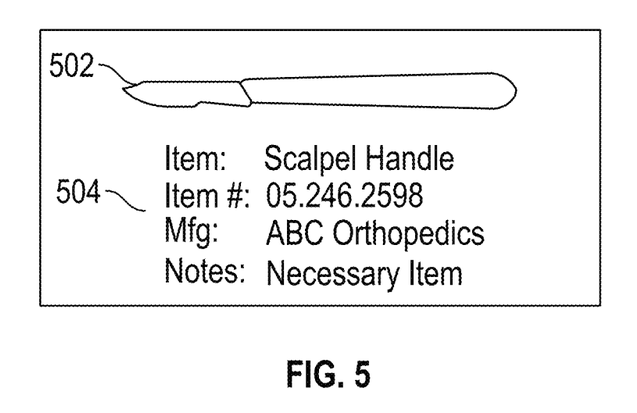
FIG. 5 illustrates an example display of missing items according to various aspects of the disclosure.

FIG. 5 illustrates an example display of missing items according to various aspects of the disclosure. In various aspects, FIG. 5 includes an illustration of additional information that could appear once a user selects a "Missing Item" 406 within the list of missing items 406 in FIG. 4. In this example, a stock image of the missing item could be displayed 502 to assist the user in locating the piece. Additional pertinent information 504 could be displayed, such as the item's name, part number, manufacturer, etc., along with any additional metadata about the selected item.

Figure 6:
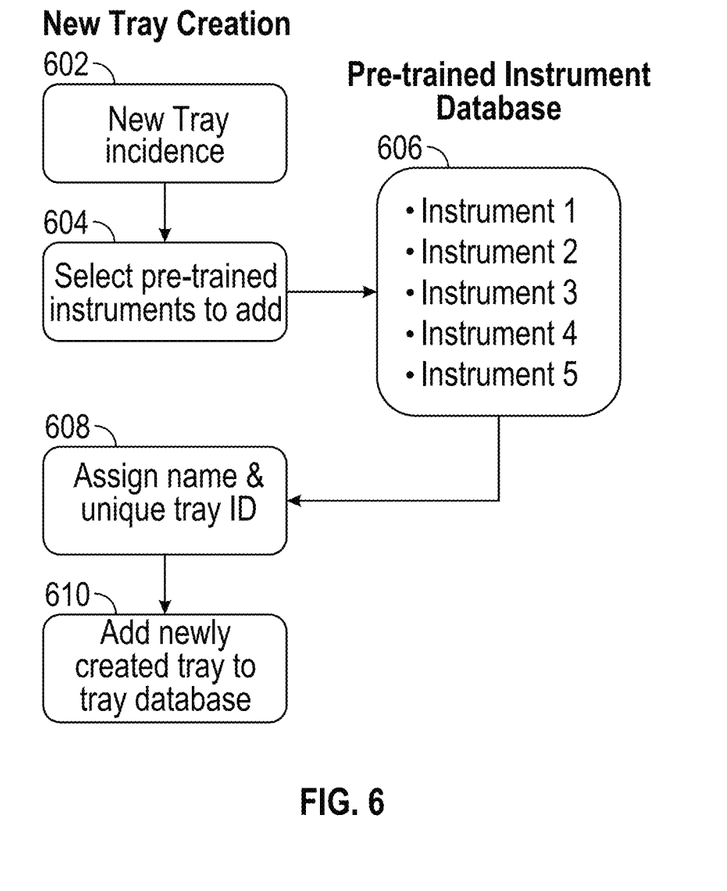
FIG. 6 illustrates an example of a new tray being created using a pre-trained instrument database.

FIG. 6 illustrates an example of a new tray being created using a pre-trained instrument database. As illustrated, a New Tray incidence 602 occurs, such as a doctor or surgeon putting in a request to create a new tray for future use. The doctor or surgeon can select pre-trained instruments to add 604 to the new tray from a pre-trained instrument database 606, then assign a name and unique tray identification 608 to the tray, such that the tray can be looked up and used again in the future. The system then adds the newly created tray to a tray database 610, with the various saved trays in the database having different combinations of instruments and/or instrument locations.

Figure 7:
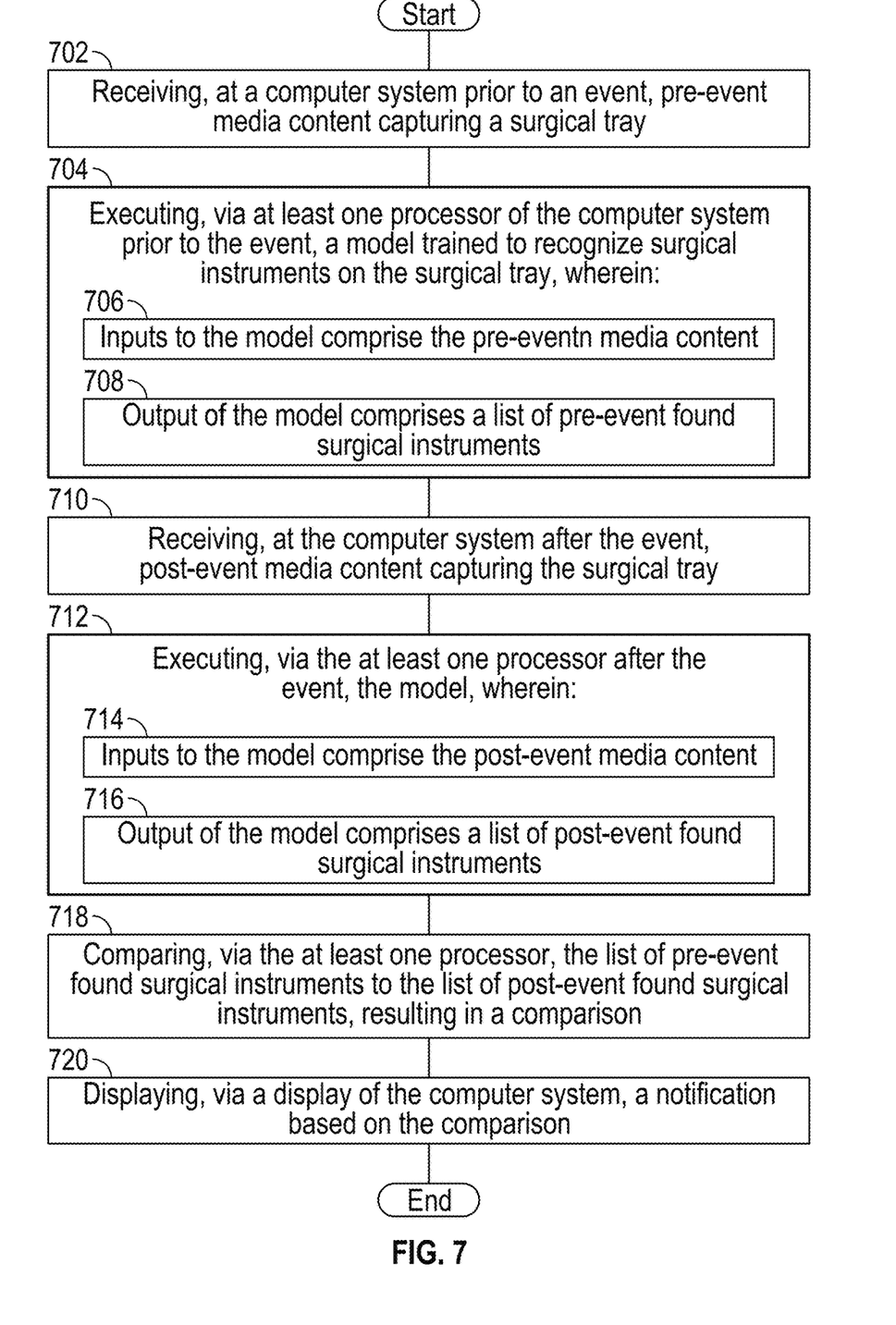
FIG. 7 illustrates an example method figure.

FIG. 7 illustrates an example method figure. As illustrated, a method can include receiving, at a computer system prior to an event, pre-event media content capturing a medical tray (702). Next, the method includes executing, via at least one processor of the computer system prior to the event, a model trained to recognize instruments on the medical tray, (704) wherein: inputs to the model comprise the pre-event media content (706); and output of the model comprises a list of pre-event found medical instruments (708). The computer system receives, post-event media content capturing the medical tray (710), and executes, via the at least one processor after the event, the model, (712) wherein: inputs to the model comprise the post-event media content (714); and output of the model comprises a list of post-event found medical instruments (716). The method then includes comparing, via the at least one processor, the list of pre-event found medical instruments to the list of post-event found medical instruments, resulting in a comparison (718) and displaying, via a display of the computer system, a notification based on the comparison (720).

In some configurations, the pre-event media content and the post-event media content can include at least one of an image, video, or a 3-D rendering. In such configurations, the at least one of an image or a video can further include a plurality of images or frames, wherein each image or frame within the plurality of images or frames are captured at a distinct angle, such that the pre-event media content and the post-event media content comprise a plurality of images or frames captured at distinct angles. Moreover, in such configurations, the execution of the model further can further include: generating, via the at least one processor using the plurality of images or frames captured at distinct angles, a three-dimensional (3D) model of each object captured within the plurality of images or frames, resulting in at least one 3D object model; and comparing the at least one 3D object model against a database of known 3D object models, resulting in an object comparison, wherein the output of the model is further based on the object comparison.

In some configurations, the illustrated method can further include cropping the pre-event media content, prior to execution of the model on the pre-event media content, to remove any content outside of the medical tray; and cropping the post-event media content, prior to execution of the model on the post-event media content, to remove any content outside of the medical tray.

In some configurations, the illustrated method can further include modifying an orientation of the pre-event media content, prior to execution of the model on the pre-event media content, to match training data used to train the model; and modifying an orientation of the post-event media content, prior to execution of the model on the post-event media content, to match training data used to train the model.

In some configurations, the model can include a neural network, the neural network having been trained using a plurality of training media content capturing medical trays and medical instruments.

In some configurations, the illustrated method can further include identifying, via the at least one processor, within the pre-event media content, a identifying code on the medical tray; retrieving, via the at least one processor from a database, a list of medical instruments which should be present within the medical tray based on the identifying code; and comparing, via the at least one processor prior to the event, the list of pre-event found medical instruments against the list of medical instruments which should be present within the medical tray.

Figure 8:
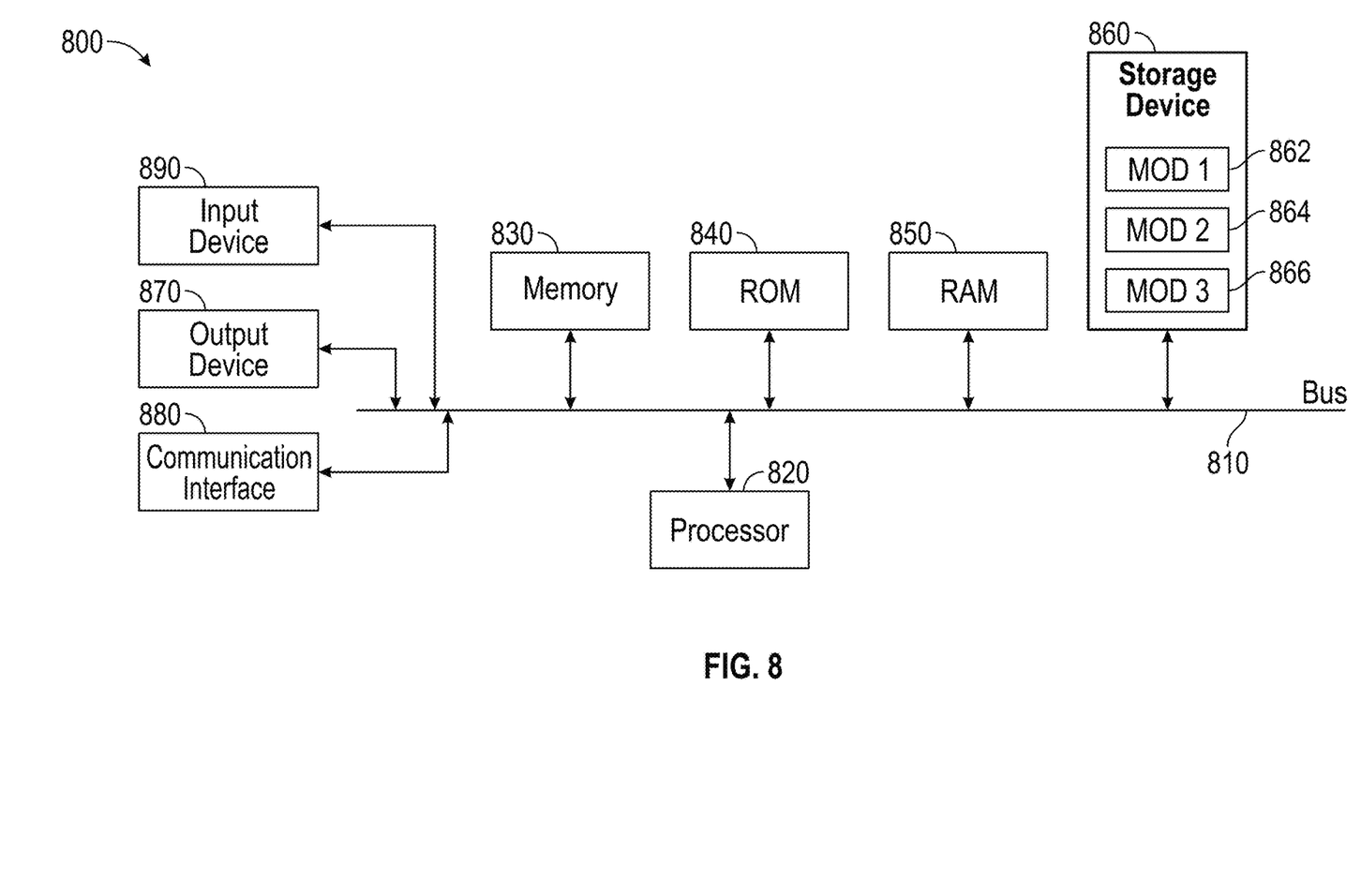
FIG. 8 illustrates an exemplary computing system used to perform the techniques disclosed herein according to various aspects of the disclosure.

FIG. 8 illustrates an exemplary computing system used to perform the techniques disclosed herein according to various aspects of the disclosure. With reference to FIG. 8, an exemplary system includes a general-purpose computing device 800, including a processing unit (CPU or processor) 820 and a system bus 810 that couples various system components including the system memory 830 such as read-only memory (ROM) 840 and random-access memory (RAM) 850 to the processor 820. The computing device 800 can include a cache of high-speed memory connected directly with, in close proximity to, or integrated as part of the processor 820. The computing device 800 copies data from the system memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The system memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general-purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, system bus 810, output device 870 (such as a display), and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computing device 800 is a small, handheld computing device, a desktop computer, or a computer server.

Although the exemplary embodiment described herein employs the storage device 860 (such as a hard disk), other types of computer-readable media which can store data that are accessible by a computer, such as magnetic cassettes, flash memory cards, digital versatile disks, cartridges, random access memories (RAMs) 850, and read-only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A method comprising: receiving, at a computer system prior to an event, pre-event media content capturing a medical tray; executing, via at least one processor of the computer system prior to the event, a model trained to recognize instruments on the medical tray, wherein: inputs to the model comprise the pre-event media content; and output of the model comprises a list of pre-event found medical instruments; receiving, at the computer system after the event, post-event media content capturing the medical tray; executing, via the at least one processor after the event, the model, wherein: inputs to the model comprise the post-event media content; and output of the model comprises a list of post-event found medical instruments; comparing, via the at least one processor, the list of pre-event found medical instruments to the list of post-event found medical instruments, resulting in a comparison; and displaying, via a display of the computer system, a notification based on the comparison.

The method of any preceding clause, wherein the pre-event media content and the post-event media content comprise at least one of an image, video, or a 3-D rendering.

The method of any preceding clause, wherein the at least one of an image or a video further comprises a plurality of images or frames, wherein each image or frame within the plurality of images or frames are captured at a distinct angle, such that the pre-event media content and the post-event media content comprise a plurality of images or frames captured at distinct angles.

The method of any preceding clause, wherein execution of the model further comprises: generating, via the at least one processor using the plurality of images or frames captured at distinct angles, a three-dimensional (3D) model of each object captured within the plurality of images or frames, resulting in at least one 3D object model; and comparing the at least one 3D object model against a database of known 3D object models, resulting in an object comparison, wherein the output of the model is further based on the object comparison.

The method of any preceding clause, further comprising: cropping the pre-event media content, prior to execution of the model on the pre-event media content, to remove any content outside of the medical tray; and cropping the post-event media content, prior to execution of the model on the post-event media content, to remove any content outside of the medical tray.

The method of any preceding clause, further comprising: modifying an orientation of the pre-event media content, prior to execution of the model on the pre-event media content, to match training data used to train the model; and modifying an orientation of the post-event media content, prior to execution of the model on the post-event media content, to match training data used to train the model.

The method of any preceding clause, wherein the model comprises a neural network, the neural network having been trained using a plurality of training media content capturing medical trays and medical instruments.

The method of any preceding clause, further comprising: identifying, via the at least one processor, within the pre-event media content, a identifying code on the medical tray; retrieving, via the at least one processor from a database, a list of medical instruments which should be present within the medical tray based on the identifying code; and comparing, via the at least one processor prior to the event, the list of pre-event found medical instruments against the list of medical instruments which should be present within the medical tray.

A system comprising: a display; at least one processor; a non-transitory computer-readable storage medium having instructions stored which, when executed by the at least one processor, cause the at least one processor to perform operations comprising: receiving, prior to an event, pre-event media content capturing a medical tray; executing, prior to the event, a model trained to recognize medical instruments in the medical tray, wherein: inputs to the model comprise the pre-event media content; and output of the model comprises a list of pre-event found medical instruments; receiving, after the event, post-event media content capturing the medical tray; executing, after the event, the model, wherein: inputs to the model comprise the post-event media content; and output of the model comprises a list of post-event found medical instruments; comparing the list of pre-event found medical instruments to the list of post-event found medical instruments, resulting in a comparison; and causing the display to display a notification based on the comparison.

The system of any preceding clause, wherein the pre-event media content and the post-event media content comprise at least one of an image or a video.

The system of any preceding clause, wherein the at least one of an image or a video further comprises a plurality of images or frames, wherein each image or frame within the plurality of images or frames are captured at a distinct angle, such that the pre-event media content and the post-event media content comprise a plurality of images or frames captured at distinct angles.

The system of any preceding clause, wherein execution of the model further comprises: generating, using the plurality of images or frames captured at distinct angles, a three-dimensional (3D) model of each object captured within the plurality of images or frames, resulting in at least one 3D object model; and comparing the at least one 3D object model against a database of known 3D object models, resulting in an object comparison, wherein the output of the model is further based on the object comparison.

The system of any preceding clause, the non-transitory computer-readable storage medium having additional instruction stored which, when executed by the at least one processor, cause the at least one processor to perform operations comprising: cropping the pre-event media content, prior to execution of the model on the pre-event media content, to remove any content outside of the medical tray; and cropping the post-event media content, prior to execution of the model on the post-event media content, to remove any content outside of the medical tray.

The system of any preceding clause, the non-transitory computer-readable storage medium having additional instruction stored which, when executed by the at least one processor, cause the at least one processor to perform operations comprising: modifying an orientation of the pre-event media content, prior to execution of the model on the pre-event media content, to match training data used to train the model; and modifying an orientation of the post-event media content, prior to execution of the model on the post-event media content, to match training data used to train the model.

The system of any preceding clause, wherein the model comprises a neural network, the neural network having been trained using a plurality of training media content capturing medical trays and medical instruments.

The system of any preceding clause, the non-transitory computer-readable storage medium having additional instruction stored which, when executed by the at least one processor, cause the at least one processor to perform operations comprising: identifying within the pre-event media content, an identifying code on the medical tray; retrieving, from a database, a list of medical instruments which should be present within the medical tray based on the identifying code; and comparing, prior to the event, the list of pre-event found medical instruments against the list of medical instruments which should be present within the medical tray.

A non-transitory computer-readable storage medium having instructions stored which, when executed by at least one processor, cause the at least one processor to perform operations comprising: receiving, prior to a event, pre-event media content capturing a medical tray; executing, prior to the event, a model trained to recognize medical instruments on the medical tray, wherein: inputs to the model comprise the pre-event media content; and output of the model comprises a list of pre-event found medical instruments; receiving, after the event, post-event media content capturing the medical tray; executing, after the event, the model, wherein: inputs to the model comprise the post-event media content; and output of the model comprises a list of post-event found medical instruments; comparing the list of pre-event found medical instruments to the list of post-event found medical instruments, resulting in a comparison; and causing a display to display a notification based on the comparison.

The non-transitory computer-readable storage medium of any preceding clause, wherein the pre-event media content and the post-event media content comprise at least one of an image or a video.

The non-transitory computer-readable storage medium of any preceding clause, wherein the at least one of an image or a video further comprises a plurality of images or frames, wherein each image or frame within the plurality of images or frames are captured at a distinct angle, such that the pre-event media content and the post-event media content comprise a plurality of images or frames captured at distinct angles.

The non-transitory computer-readable storage medium of any preceding clause, wherein execution of the model further comprises: generating, using the plurality of images or frames captured at distinct angles, a three-dimensional (3D) model of each object captured within the plurality of images or frames, resulting in at least one 3D object model; and comparing the at least one 3D object model against a database of known 3D object models, resulting in an object comparison, wherein the output of the model is further based on the object comparison.

We claim:

1. A method comprising:
   receiving, at a computer system prior to an event, pre-event media content capturing a medical tray, the pre-event media content comprising at least one of a plurality of pre-event images or a pre-event video, the pre-event media content captured from a camera, wherein each image or frame within the plurality of pre-event images or the pre-event video are captured at a distinct angle from other images or frames within the plurality of pre-event images or the pre-event video;
   executing, via at least one processor of the computer system prior to the event, a model trained to recognize instruments on the medical tray, wherein:
      inputs to the model comprise the pre-event media content; and
      output of the model comprises a list of pre-event found medical instruments;
   receiving, at the computer system after the event, post-event media content capturing the medical tray, the post-event media content captured from the camera, the post-event media content comprising at least one of a plurality of post-event images or a post-event video, wherein each image or frame within the plurality of post-event images or the post-event video are captured at a distinct angle from other images or frames within the plurality of post-event images or the pre-event video;
   executing, via the at least one processor after the event, the model, wherein:
      inputs to the model comprise the post-event media content;
      output of the model comprises a list of post-event found medical instruments, and
      wherein execution of the model further comprises:
         generating, via the at least one processor using one of the plurality of pre-event images or frames or the plurality of post-event images or frames captured at distinct angles, a three-dimensional (3D) model of each object captured within the one of the plurality of pre-event images or frames or the plurality of post-event images or frames, resulting in at least one 3D object model; and
         comparing the at least one 3D object model against a database of known 3D object models, resulting in an object comparison,
      wherein the output of the model is further based on the object comparison;
   comparing, via the at least one processor, the list of pre-event found medical instruments to the list of post-event found medical instruments, resulting in a comparison; and
   displaying, via a display of the computer system, a notification based on the comparison.

2. The method of claim 1, further comprising:
   cropping the pre-event media content, prior to execution of the model on the pre-event media content, to remove any content outside of the medical tray; and
   cropping the post-event media content, prior to execution of the model on the post-event media content, to remove any content outside of the medical tray.

3. The method of claim 1, further comprising:
   modifying an orientation of the pre-event media content, prior to execution of the model on the pre-event media content, to match training data used to train the model; and
   modifying an orientation of the post-event media content, prior to execution of the model on the post-event media content, to match training data used to train the model.

4. The method of claim 1, wherein the model comprises a neural network, the neural network having been trained using a plurality of training media content capturing medical trays and medical instruments.

5. The method of claim 1, further comprising:
   identifying, via the at least one processor, within the pre-event media content, a identifying code on the medical tray;
   retrieving, via the at least one processor from a database, a list of medical instruments which should be present within the medical tray based on the identifying code; and
   comparing, via the at least one processor prior to the event, the list of pre-event found medical instruments against the list of medical instruments which should be present within the medical tray.

6. A system comprising:
   a display;
   a camera;
   at least one processor;
   a non-transitory computer-readable storage medium having instructions stored which, when executed by the at least one processor, cause the at least one processor to perform operations comprising:
      receiving, prior to an event, pre-event media content capturing a medical tray, the pre-event media content comprising at least one of a plurality of pre-event images or a pre-event video, the pre-event media content captured from the camera, wherein each image or frame within the plurality of pre-event images or the pre-event video are captured at a distinct angle from other images or frames within the plurality of pre-event images or the pre-event video;
      executing, prior to the event, a model trained to recognize medical instruments in the medical tray, wherein:

inputs to the model comprise the pre-event media content; and output of the model comprises a list of pre-event found medical instruments;

receiving, after the event, post-event media content capturing the medical tray, the post-event media content comprising at least one of a plurality of post-event images or a post-event video, the post-event media content captured from the camera, wherein each image or frame within the plurality of post-event images or the post-event video are captured at a distinct angle from other images or frames within the plurality of post-event images or the pre-event video;

executing, after the event, the model, wherein:

inputs to the model comprise the post-event media content;

output of the model comprises a list of post-event found medical instruments;

wherein execution of the model further comprises:

generating, via the at least one processor using one of the plurality of pre-event images or frames or the plurality of post-event images or frames captured at distinct angles, a three-dimensional (3D) model of each object captured within the one of the plurality of pre-event images or frames or the plurality of post-event images or frames, resulting in at least one 3D object model; and comparing the at least one 3D object model against a database of known 3D object models, resulting in an object comparison, wherein the output of the model is further based on the object comparison;

comparing the list of pre-event found medical instruments to the list of post-event found medical instruments, resulting in a comparison; and causing the display to display a notification based on the comparison.

7. The system of claim 6, the non-transitory computer-readable storage medium having additional instruction stored which, when executed by the at least one processor, cause the at least one processor to perform operations comprising:

cropping the pre-event media content, prior to execution of the model on the pre-event media content, to remove any content outside of the medical tray; and cropping the post-event media content, prior to execution of the model on the post-event media content, to remove any content outside of the medical tray.

8. The system of claim 6, the non-transitory computer-readable storage medium having additional instruction stored which, when executed by the at least one processor, cause the at least one processor to perform operations comprising:

modifying an orientation of the pre-event media content, prior to execution of the model on the pre-event media content, to match training data used to train the model; and modifying an orientation of the post-event media content, prior to execution of the model on the post-event media content, to match training data used to train the model.

9. The system of claim 6, wherein the model comprises a neural network, the neural network having been trained using a plurality of training media content capturing medical trays and medical instruments.

10. The system of claim 6, the non-transitory computer-readable storage medium having additional instruction stored which, when executed by the at least one processor, cause the at least one processor to perform operations comprising:

identifying within the pre-event media content, an identifying code on the medical tray;

retrieving, from a database, a list of medical instruments which should be present within the medical tray based on the identifying code; and comparing, prior to the event, the list of pre-event found medical instruments against the list of medical instruments which should be present within the medical tray.

11. A non-transitory computer-readable storage medium having instructions stored which, when executed by at least one processor, cause the at least one processor to perform operations comprising:

receiving, prior to a event, pre-event media content capturing a medical tray, the pre-event media content comprising at least one of a plurality of pre-event images or a pre-event video, the pre-event media content captured from a camera, wherein each image or frame within the plurality of pre-event images or the pre-event video are captured at a distinct angle from other images or frames within the plurality of pre-event images or the pre-event video;

executing, prior to the event, a model trained to recognize medical instruments on the medical tray, wherein:

inputs to the model comprise the pre-event media content; and output of the model comprises a list of pre-event found medical instruments;

receiving, after the event, post-event media content capturing the medical tray, the post-event media content comprising at least one of a plurality of post-event images or a post-event video, the post-event media content captured from the camera, wherein each image or frame within the plurality of post-event images or the post-event video are captured at a distinct angle from other images or frames within the plurality of post-event images or the pre-event video;

executing, after the event, the model, wherein:

inputs to the model comprise the post-event media content;

output of the model comprises a list of post-event found medical instruments; and wherein execution of the model further comprises:

generating, via the at least one processor using one of the plurality of pre-event images or frames or the plurality of post-event images or frames captured at distinct angles, a three-dimensional (3D) model of each object captured within the one of the plurality of pre-event images or frames or the plurality of post-event images or frames, resulting in at least one 3D object model; and comparing the at least one 3D object model against a database of known 3D object models, resulting in an object comparison, wherein the output of the model is further based on the object comparison;

comparing the list of pre-event found medical instruments to the list of post-event found medical instruments, resulting in a comparison; and causing a display to display a notification based on the comparison.

12. The method of claim 1, further comprising:
capturing the pre-event media content and the post-event media content captured using more than one camera.

* * * * *